US005211211A

United States Patent [19]

Rubino et al.

[11] Patent Number: 5,211,211

[45] Date of Patent: May 18, 1993

[54] PULLING TOOL

[75] Inventors: Michael Rubino, 7419 W. Ardmore, Chicago, Ill. 60631; Michael Berg, Elgin, both of Ill.

[73] Assignee: Michael Rubino, Chicago, Ill. ; by said Michael Berg

[21] Appl. No.: 900,348

[22] Filed: Jun. 18, 1992

Related U.S. Application Data

[63] Continuation-in-part of Ser. No. 737,046, Jul. 29, 1991, Pat. No. 5,163,211.

[51] Int. Cl.[5] .......... B23P 19/04

[52] U.S. Cl. .......... 29/259; 29/261; 29/426.4; 29/598; 29/764

[58] Field of Search .......... 29/764, 758, 762, 258–262, 29/267, 596, 598, 426.4

[56] References Cited

U.S. PATENT DOCUMENTS

| | | | |
|---|---|---|---|
| 2,170,461 | 8/1939 | Pepperdine | 29/261 X |
| 2,188,074 | 1/1940 | Condon | 29/261 |
| 3,383,755 | 5/1968 | Chmielewski . | |
| 3,735,471 | 5/1973 | Kappler | 29/261 |
| 3,846,898 | 11/1974 | Kerr . | |
| 4,077,103 | 3/1978 | Kelley | 29/259 |
| 4,174,558 | 11/1979 | Dombrowski . | |
| 4,656,715 | 4/1987 | Diaz . | |
| 4,970,771 | 11/1990 | Wood . | |

*Primary Examiner*—Carl E. Hall
*Attorney, Agent, or Firm*—Milton S. Gerstein

[57] ABSTRACT

An improved tool for pulling off a rotor of a motor from a shaft or a fan from a shaft, which improved tool is provided with hooked arms that are releasably but securely held at one end in the housing, without the use of retaining clips, so that the arms do not fall off during use or become lost, and so that they do not interfere with the use of the tool when using the securing bolts for pulling off a rotor. The hooked arms of the invention are also hexagonal shaped, and securing bolts are provided with hexagonal-shaped recesses in their heads, so that the hooked arms may themselves be used for rotating the securing bolts when pulling off a rotor of a motor from a shaft. In addition, the housing of the improved tool of the invention is circular in shape, and is provided with a plurality of equally-spaced holes about its circumference, which holes received the hooked ends of the hooked arms, so that various configurations of hooked arms may be provided to best suit the configuration of vanes and type of fan being pulled off a shaft. To ensure that the each hooked arm is releasably retained in a respective hole of the housing, the end of the arm is provided with a hook defined by a straight piece extending at an acute angle with respect with the main, elongated body of the arm.

21 Claims, 2 Drawing Sheets

10
12
12'
14
14'
16
18
20
22
26
26'
28
28'
28"
30
32
32'
40
42
5
7

PULLING TOOL

CROSS-REFERENCE TO RELATED APPLICATION

The present application is a continuation-in-part of copending application Ser. No. 07/737,046, filed Jul. 29, 1991, now U.S. Pat. No. 5,163,211.

BACKGROUND OF THE INVENTION

The present invention is directed to a tool for pulling off a rotor of a motor or a fan from a shaft. In U.S. Pat. No. 4,077,103—Kelley, which is incorporated by reference herein, there is disclosed such a tool for pulling off a rotor of a motor or a fan from a shaft. The tool includes an elongated, rotatable screw that is partially threaded in a hollow housing. The end of the elongated screw can be made to protrude from the end of the housing by rotating the screw in a first direction. By causing the end of the screw to protrude from the housing, the end may be brought into abutting engagement with the end of a shaft on which is mounted a rotor of a squirrel-cage motor, for example, or a fan. The housing is provided with means for securing the housing to either the rotor of a motor or to a fan, whereby, after abutting the end of the elongated screw against the end of the shaft, the screw is rotated causing the housing, with the securing means, to be translated along the screw, in a direction away from the shaft, which housing thereby carries along with it the rotor of the motor or the fan on the shaft to which the securing means had been applied. The securing means takes the form of a plurality of rotatable gripping bolts that are used for gripping the outer surface of a rotor of a motor, or the like, while, for removing a fan, or the like, from a shaft, a plurality of hooked arms are provided with an end of each hooked arm being removably received in a hole of the housing, with the other end "hooking" a rear surface-portion of the fan, whereby the respective rotor or fan, or the like, may be pulled off the shaft according to the method above-described. However, the hooked arms of this patent suffer from the serious disadvantage of falling out from their insertion-hole in the housing. Thus, the tool of the patent is also provided with retaining clips for holding the hooked arms in place, so that do not fall out and become lost, and so they do not interfere with the use of the securing bolts when pulling off a rotor of a motor, or the like, from a shaft. However, these retaining clips have not been found to be practicable in use, and have been ineffective in preventing the hooked arms from falling out and from interfering with the securing bolts for a rotor of a motor. In addition, the shape of the housing in the tool of the patent is square-shaped with the holes formed in the housing for receiving the ends of the hooked arms being provided in two, adjacent pairs, where one pair of holes is formed in one lateral surface face of the housing, and the other pair of holes in the opposite surface face of the housing. This arrangement fixes the manner in which the hooked arms are arranged with respect to the housing, which is a severe detriment to the use of the tool, since not all fans are provided with the same number of vanes nor with vanes of the same angular extent. Thus, where the hooked arms may be perfectly suited for a fan with four blades, the tool can only be used with difficulty for fans having more or less than four vanes, or a fan having vanes of considerably different angular extent.

SUMMARY OF THE INVENTION

The present invention is directed to an improved tool for pulling off a rotor of a motor from a shaft or a fan from a shaft, which improved tool is provided with hooked arms that are releasably but securely held at one end in the housing, without the use of retaining clips, so that the arms do not fall off during use or become lost, and so that they do not interfere with the use of the tool when using the securing bolts for pulling off a rotor. The hooked arms of the invention are also hexagonal-shaped, and the securing bolts are provided with hexagonal-shaped recesses in their heads, so that the hooked arms may themselves be used for rotating the securing bolts when pulling off a rotor of a motor from a shaft. In addition, the housing of the improved tool of the invention is circular in shape, and is provided with a plurality of equally-spaced holes about its circumference, which holes received the hooked ends of the hooked arms, so that various configurations of hooked arms may be provided to best suit the configuration of vanes and type of fan being pulled off from a shaft. To ensure that the each hooked arm is releasably retained in a respective hole of the housing, the end of the arm is provided with a hook defined by a straight piece extending at an acute angle with respect with the main, elongated body of the arm. Also provided are peep-holes for viewing into the interior of the housing, in order to ensure that the end of the screw is properly aligned with the end of a shaft when the tool is used for pulling off a workpiece.

BRIEF DESCRIPTION OF THE DRAWINGS

The invention will be more readily understood with reference to the accompanying drawing, wherein.

DETAILED DESCRIPTION OF THE INVENTION

Figures 1, 2, 3, 4, 5, 6, 7:
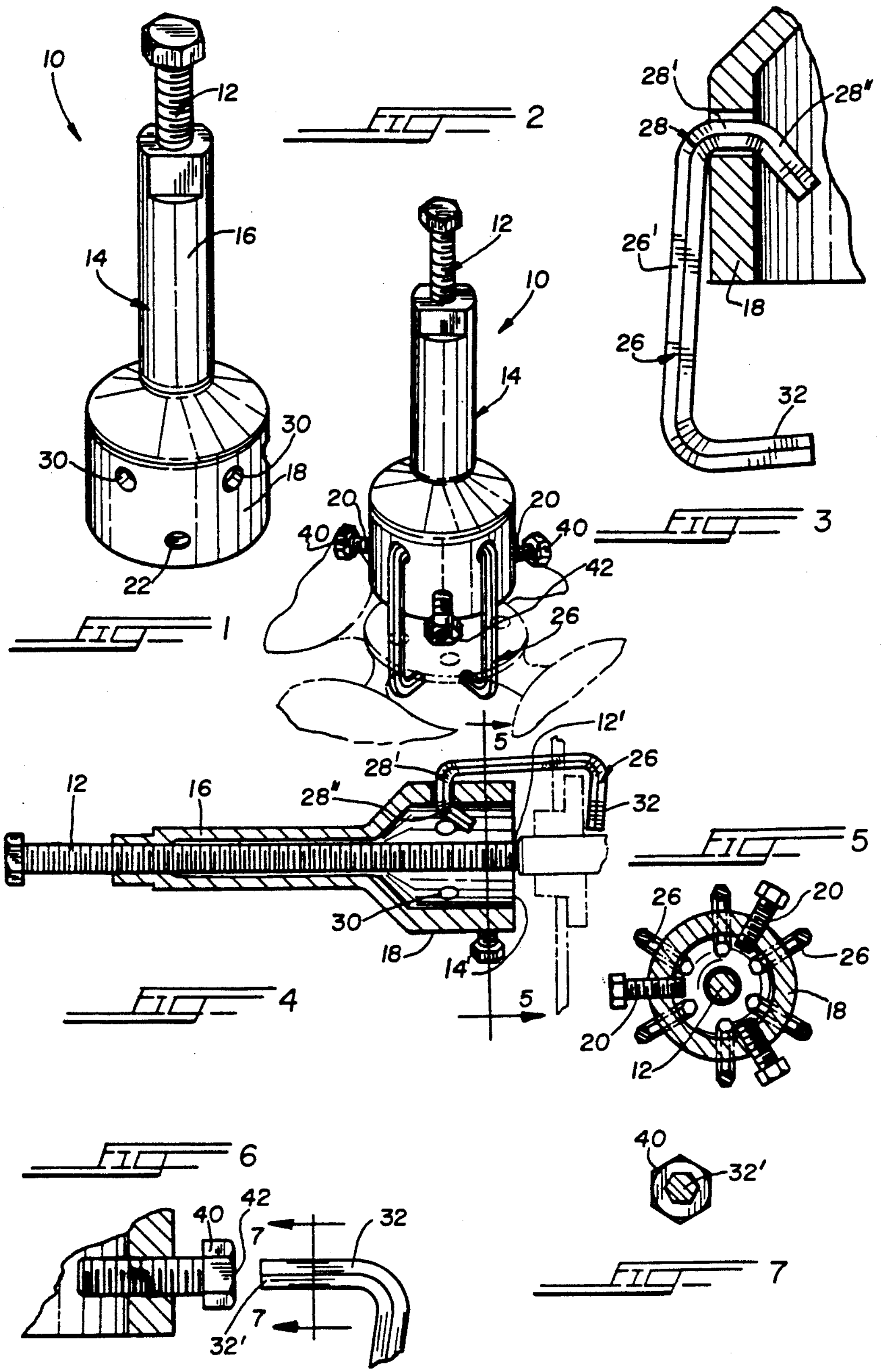
FIG. 1 is an isometric view of the pulling tool of the invention.
FIG. 2 is an isometric view thereof showing the tool in use for pulling off a fan from a shaft.
FIG. 3 is a detail view, in partial across section, showing the shape of the upper end of each hooked securing arm for releasable but securely mounting it in a hole of the housing of the tool of the invention.
FIG. 4 is a longitudinal cross-sectional view of the tool showing the hooked securing arms in use.
FIG. 5 is a cross-sectional view taken along line 5—5 of FIG. 4.
FIG. 6 is a plan view showing the supplemental use of each hooked securing arm for rotating the securing bolts.
FIG. 7 is a cross-sectional view taken along line 7—7 of FIG. 6.

Referring now to the drawings in greater detail, the tool of the invention is indicated generally by reference numeral 10. The tool includes an elongated, rotatable screw 12 that is rotatably mounted in a hollow housing 14. The length of the screw 12 is greater than the length of the housing, so that the end 12' of the screw may be made to protrude out of the enlarged open end 14' of the housing. The housing 14 is itself divided into a narrow-diameter portion 16, and an larger-diameter portion 18. The narrow-diameter portion prevents the screw 12 from wobbling during use. The larger-diameter portion 18 mounts securing means which contact the element, such as rotor of a motor or a fan, for pulling it off a shaft. The securing means has a first set of bolts 20 that are rotatable in holes 22 formed in the housing which grip, at their interior ends, the outer, circumferential surface of a rotor to be pulled off from a shaft. The securing means also has a series of hooked, securing arms 26 that are used for gripping a fan for pulling the fan off from the shaft. Each securing arm has a main, elongated portion 26', a first end 28 for passage through one of a plurality of holes 30 formed in the housing, and a second end 32 that "hooks" the fan from behind, in the manner depicted in FIGS. 2 and 4. The above-described parts are conventional, as shown in U.S. Pat. No. 4,077,103—Kelley.

The tool 10, however, is a considerable improvement over the prior art, as described hereinbelow. Whereas the prior art housing was rectilinear in cross section, the larger-diameter housing portion 18 is circular in cross section, with the holes 30 equally spaced thereabout. The number of holes is preferably six in number. This arrangement of the holes 30 allows for the securing arms 26 to be equally-spaced apart which better matches the vanes of a fan to be pulled off, and also allows for different arrangements. For example, when a fan with only three vanes is to be pulled off, only three securing arms 26 need be used, which three are inserted into every other hole 30 to better match the configuration of the fan to be removed. The arrangement of holes 30 allow for other arrangements of the securing arms 26 that suit the particular fan, or similar device, to be pulled off, providing a much more adaptable and flexible tool to suit various types of jobs and environments.

Each securing arm has a first, hooked end 28 made up of a first, substantially-horizontal section 28', and a second, angular section 28''. The angular section 28'' forms an acute angle with respect to the vertical, center line of the main elongated portion 26' of the securing arm. In the preferred embodiment, this acute angle is between 30 and 60 degrees with respect to the vertical, when viewing FIG. 3. This acute-angle section 28'' with horizontal section 28' allows for insertion of the first end of the securing arm through a hole 30 in a relatively easy manner, and yet prevents the accidental removal of the first end from the housing 14. The straight, horizontal section 28' acts as a fulcrum, and ensures that the main elongated portion 26' of the securing arm is allowed to hang downwardly as close to vertical as possible, and provide enough leeway, so that the second end of the securing arm may be "hooked" about the back of a fan, or the like to be pulled off from a shaft, such leeway also resulting from the acute-angle section 28 '' and its contact against the interior wall surface adjacent the respective hole 30, which provides a fulcrum for rotation a direction perpendicular to the rotation allowed by the horizontal section 28', whereby the securing arm may be rotated to a limited enough degree for entraining the second hooked end of the securing arm in back of the fan for gripping it, if necessary. Each hole 30 has a diameter larger than the diameter of the securing arm, so as to also provide the necessary leeway to the first end 28' of the securing arm to ensure the limited pivoting of the first end 28' about the fulcrum provided by the acute-angle section 28''.

Each securing arm 26 of the invention has an hexagonal cross-sectional shape, as seen in FIG. 7. The reason for this is to allow the use of each securing arm for rotating the securing bolts 20. Each bolt has a hex-head portion 40 that may be gripped by a conventional wrench for rotating the bolt, and also has, according to the invention, a hexagonal-shaped recess 42 which receives the hexagonally-shaped end 32' of the second end 32 of a securing arm, whereby the securing arm may be used as a driver for rotating the bolt. Since, when the bolts 20 are used for pulling off a rotor of a motor, the securing arms 26 are not needed, the present invention allows for a dual-function for the securing arms. The other arms 26 not being used to rotate the bolts 20 are prevented from falling out during their nonuse period by the acute-angle section 28'' above-described, and also are prevented from interfering with the bolts 20, since they cannot accidentally fall out, and since they only have a very limited capability of angular pivoting in a direction where the second end 32 moves toward the housing portion 18.

Figure 8:
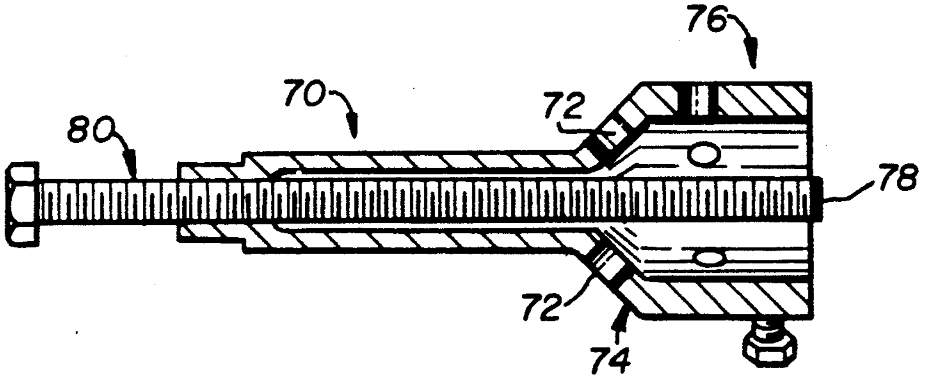
FIG. 8 is a cross-sectional view of a modification of the pulling tool of the invention in which there is are provided sight-holes for viewing the emplacement of the tool.
Figure 9:
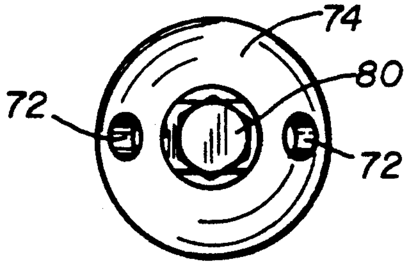
FIG. 9 is a top view thereof.

Referring to FIGS. 7 and 8, there is shown a modification 70 of the tool. The pulling tool 70 is substantially identical to the tool 10, except for the additions of a plurality of peep-holes or sight holes 72. The holes 72 are placed on the frusto-conical section 74 of the housing section 76. As seen in FIG. 9, two such holes 72 are provided, spaced 180 0 degrees apart, although more or less than two may be used. When more than two are provided, the holes would also be spaced equidistantly apart. The peep-holes 72 provide a line-of-sight to the interior of the housing 76 when the tool 70 is being put in place. Without the provision of the peep-holes 72, it sometimes may occur that the end 78 of the screw 80 may not placed directly against the end of the shaft, or the like, but against a different portion, without the user of the tool being aware of it. By providing the peep-holes 72, the user may gaze directly into the interior of the housing section 76, and see directly if the end 78 of the screw 80 is in proper, abutting contact against the end of the shaft. Owing to the frusto-conical shape of the housing section 74, the surface thereof slopes upwardly to meet at a common area. Therefore, the lines of sight provided by each peep-hole 72 intersect the lines of sight provided by the other peep-holes 72, where at least some line-of-sight provided by each peep-hole 72 intersects the end 78 of the screw when the end is extended into its operative engagement with a shaft-end. The holes 72 are made large enough, so that, for all extensions of the screw-end 78, there is a line-of-sight provided thereto. By virtue of the fact that the peep-holes 72 are provided on the frusto-conical section 74, the required size thereof is reduced, since the sloping surfaces of the frusto-conical section 74 naturally direct the lines-of-sight toward the end 78 of the screw, whereby the structural integrity of the housing proper is less compromised. The peep-holes 72 are also preferably placed high enough along the sloping surface of the frusto-conical section 74 so that the required lines-of-sight clear the hooked ends 28 of the securing arms 26 described above, which project into the interior of the housing 74 through the equally-spaced holes 30 seen in FIG. 1. Thus, preferably, each peep-hole 72 is placed above and arcuately between two adjacent holes 30 rather than being aligned with any one of them, although, of course, the alignment thereof may be provided, as long as the peep-holes 72 are large enough in order to provide the proper lines-of-sight.

While a specific embodiment of the invention has been shown and described, it is to be understood that numerous changes and modifications may be made therein without departing from the scope, spirit and intent of the invention as set forth in the appended claims.

What is claimed is:

1. In a pulling tool for pulling off a rotor of a motor or a fan from a shaft, said pulling tool comprising an elongated screw having a first end and a second end, a hollow housing with which said screw is threadingly received, said housing comprising a first open end through which threadingly passes said screw, and a second open end through which protrudes said second end of said screw, said housing comprising a first securing means for releasably holding a rotor of a motor, and second securing means for releasably holding a fan, said first securing means comprising a plurality of rotatable bolts and a first plurality of holes formed in said housing for threadingly receiving said plurality of bolts, and said second securing means comprises a plurality of hooked securing arm-members, each said arm-member having a first end and a second hooked end, and a second plurality of holes for removably receiving the first ends of said arm-members, said second end of each said arm-member being capable of being hung so as to protrude beyond said second open end of said housing, wherein the improvement comprises:

said housing comprising a first section having a circular cross section;

said first section of said housing comprising a main, circular portion, and a frusto-conical section connected to said main, circular portion and having sloping surfaces, said frusto-conical section having a smaller-diameter end and a larger-diameter end; said second plurality of holes being formed in said main circular portion;

and at least one through-hole formed in said frusto-conical section for viewing the interior of said first section and the alignment of said second end of said screw in its operative, protruding state, whereby the user of the tool may visually ensure the proper emplacement of said second end of said screw against a shaft-end;

said housing further comprising a second, smaller-diameter section having a first end constituting said first open end, and a second end connected to said frusto-conical section, said second end of said second section being connected to said smaller-diameter end of said frusto-conical section.

2. The tool according to claim 1, wherein said at least one through-hole has a diameter great enough to provide lines-of-sight to said second end of said screw for various protrusions of said second end of said screw beyond said second open end of said housing.

3. The tool according to claim 1, comprising two said through-holes formed in said frusto-conical section.

4. The tool according to claim 3, wherein said two through-holes are spaced 180 degrees apart.

5. The tool according to claim 3, wherein said second plurality of holes are equally spaced about said main circular portion.

6. The tool according to claim 1, wherein said second plurality are equally spaced about said main circular portion.

7. The tool according to claim 1, wherein said through-hole is arcuately located between two adjacent ones of said second plurality of holes, so that no obstruction takes place by a hooked end of a securing arm-member.

8. The tool according to claim 3, wherein said through-hole is arcuately located between two adjacent ones of said second plurality of holes, so that no obstruction takes place by a hooked end of a securing arm-member.

9. In a pulling tool for pulling off a rotor of a motor or a fan from a shaft, said pulling tool comprising an elongated screw having a first end and a second end, a housing with which said screw is threadingly received, said housing comprising a first open end through which threadingly passes said screw, and a second open end through which protrudes said second end of said screw, said housing comprising a first securing means for releasably holding a rotor of a motor, and second securing means for releasably holding a fan, said first securing means comprising a plurality of rotatable bolts and a first plurality of holes formed in said housing for threadingly receiving said plurality of bolts, and said second securing means comprises a plurality of hooked securing arm-members, each said arm-member having a first end and a second hooked end, and a second plurality of holes for removably receiving the first ends of said arm-members, said second end of each said arm-member being capable of being hung so as to protrude beyond said second open end of said housing, wherein the improvement comprises:

said housing comprising at least a first section having a circular cross section; said second plurality of holes being formed in said circular cross-section section; said second plurality of holes being substantially equally spaced about said section;

said second plurality of holes being located level with each other, so that said second plurality of holes are the same distance from said second open and;

said first plurality of holes also being formed in said circular first section, below said second plurality of holes, and closed to said second open end;

each hole of said first plurality of holes being vertically below and horizontally between respective adjacent two holes of said second plurality of equally-spaced holes, so that said bolts do not interfere with the passage and use of said arm-members, said first plurality of holes being located level with each other, so that said first plurality of holes lie the same distance from second open end, and lie closer to said second open end than said second plurality of holes.

10. The tool according to claim 9, wherein said first plurality of holes are three in number and spaced 120 degrees apart about said circular first section.

11. The tool according to claim 9, wherein said second plurality of holes are six in number and are spaced 60 degrees apart about said circular first section.

12. The tool according to claim 11, wherein said second securing means comprises at least three arm-members with the first ends of said three arm-members being removably mounted in three said holes of said second plurality of holes, said three holes being alternate ones of said holes of said second plurality of holes.

13. The tool according to claim 11, wherein said second securing means comprises four arm-members with the first ends of said four arm-members being removably mounted in four said holes of said second plurality of holes, said four holes being chosen ones of said holes of said second plurality of holes for best matching the type of fan to be removed.

14. In a pulling tool for pulling off a rotor of a motor or a fan from a shaft, said pulling tool comprising an elongated screw having a first end and a second end, a hollow housing with which said screw is threadingly received, said housing comprising a first open end through which threadingly passes said screw, and a second open end through which protrudes said second end of said screw, said housing comprising a first securing means for releasably holding a rotor of a motor, and second securing means for releasably holding a fan, said first securing means comprising a plurality of rotatable bolts and a first plurality of holes formed in said housing for threadingly receiving said plurality of bolts, and said second securing means comprises a plurality of hooked securing arm-members, each said arm-member having a first end and a second hooked end, and a second plurality of holes for removably receiving the first ends of said arm-members, said second end of each said arm-member being capable of being hung so as to protrude beyond said second open end of said housing, wherein the improvement comprises:

said housing comprising a first section having a circular cross section;

said first section of said housing comprising a main, circular portion, and a frusto-conical section connected to said main, circular portion and having sloping surfaces, said frusto-conical section having a smaller-diameter end and a larger-diameter end; said second plurality of holes being formed in said main circular portion;

said second plurality of holes comprising at least six holes spaced about said main circular portion, said at least six holes being located level with each other, so that said at least six holes are the same distance from second open end;

said housing further comprising a second, smaller-diameter section having a first end constituting said first open end, and a second end connected to said frusto-conical section, said second end of said second section being connected to said smaller-diameter end of said frusto-conical section.

15. The tool according to claim 14, wherein said second plurality of holes comprises six said holes spaced equidistantly apart about the circumference of said main circular portion.

16. The tool according to claim 14, wherein said first plurality of holes are also formed in said main circular portion, and below said second plurality of holes, closer to said second open end.

17. The tool according to claim 14, wherein said first plurality of holes are also formed in said main circular portion; each hole of said first plurality of holes being vertically below and horizontally between adjacent two holes of said second plurality of holes, so that said bolts do not interfere with the passage of said arm-members, said first plurality of holes being located level with each other, so that said first plurality of holes lie the same distance from second open end and lie closer to said second open end.

18. The tool according to claim 17, wherein said first plurality of holes are three in number and spaced 120 degrees apart about said main circular portion.

19. The tool according to claim 16, wherein said second plurality of holes are six in number, and are spaced 60 degrees apart about said main circular portion; each said hole of said first plurality of holes lying horizontally between two adjacent said holes of said second plurality of holes.

20. The tool according to claim 14, wherein said second securing means comprises at least three arm-members with the first ends of said three arm-members being removably mounted in three said holes of said second plurality of holes, said three holes being alternate ones of said holes of said second plurality of holes.

21. The tool according to claim 20, wherein said second securing means comprises four arm-members with the first ends of said four arm-members being removably mounted in four said holes of said second plurality of holes, said four holes being chosen ones of said holes of said second plurality of holes for best matching the type of fan to be removed.

* * * * *